US012645768B1

(12) United States Patent
Antebi et al.

(10) Patent No.: US 12,645,768 B1
(45) Date of Patent: Jun. 2, 2026

(54) SPECULATIVE TEXTUAL WATERMARKING IN MACHINE LEARNING

(71) Applicant: INTUIT INC., Mountain View, CA (US)

(72) Inventors: Sagiv Antebi, Tel Aviv (IL); Matan Vetzler, 'Givat Shmuel (IL); Ofir Ben Shoham, Giv'atayim (IL); Shai Ardazi, Petah Tikva (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/415,022

(22) Filed: Dec. 10, 2025

(51) Int. Cl.
*G06F 21/16* (2013.01)
*G06N 20/00* (2019.01)

(52) U.S. Cl.
CPC ............. *G06F 21/16* (2013.01); *G06N 20/00* (2019.01)

(58) Field of Classification Search
CPC .......... G06F 21/16; G06N 20/00; G06N 3/08; G06N 3/084
See application file for complete search history.

(56) References Cited

U.S. PATENT DOCUMENTS

| | | | | |
|---|---|---|---|---|
| 11,163,861 | B2 * | 11/2021 | Poddar | G06F 21/121 |
| 11,704,391 | B2 * | 7/2023 | Poddar | G06F 21/121 |
| | | | | 713/176 |
| 2024/0320529 | A1 * | 9/2024 | Dathathri | G06F 21/16 |
| 2026/0046317 | A1 * | 2/2026 | Crabtree | H04L 63/104 |
| 2026/0080038 | A1 * | 3/2026 | Hu | G06F 21/16 |

* cited by examiner

*Primary Examiner* — Mohammad A Siddiqi
(74) *Attorney, Agent, or Firm* — Patterson + Sheridan, LLP

(57) ABSTRACT

Aspects of the present disclosure involve watermark-preserving speculative text generation. Aspects include generating, by a draft machine learning model based on a prompt, a lookahead comprising a plurality of candidate next tokens with draft probabilities, wherein the draft machine learning model has been trained on watermarked outputs generated, based on a watermarking key, using a target machine learning model. Aspects include evaluating, in a single inference pass of the target machine learning model, the plurality of candidate next tokens, based on the watermarking key, to generate target probabilities. Aspects include accepting a first token subset of the plurality of candidate next tokens based on comparing the target probabilities to the draft probabilities. Aspects include generating, by the target machine learning model, one or more replacement tokens for a second token subset comprising each candidate next token of the plurality of candidate next tokens not included in the first token subset.

19 Claims, 6 Drawing Sheets

100

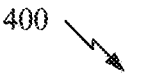
400
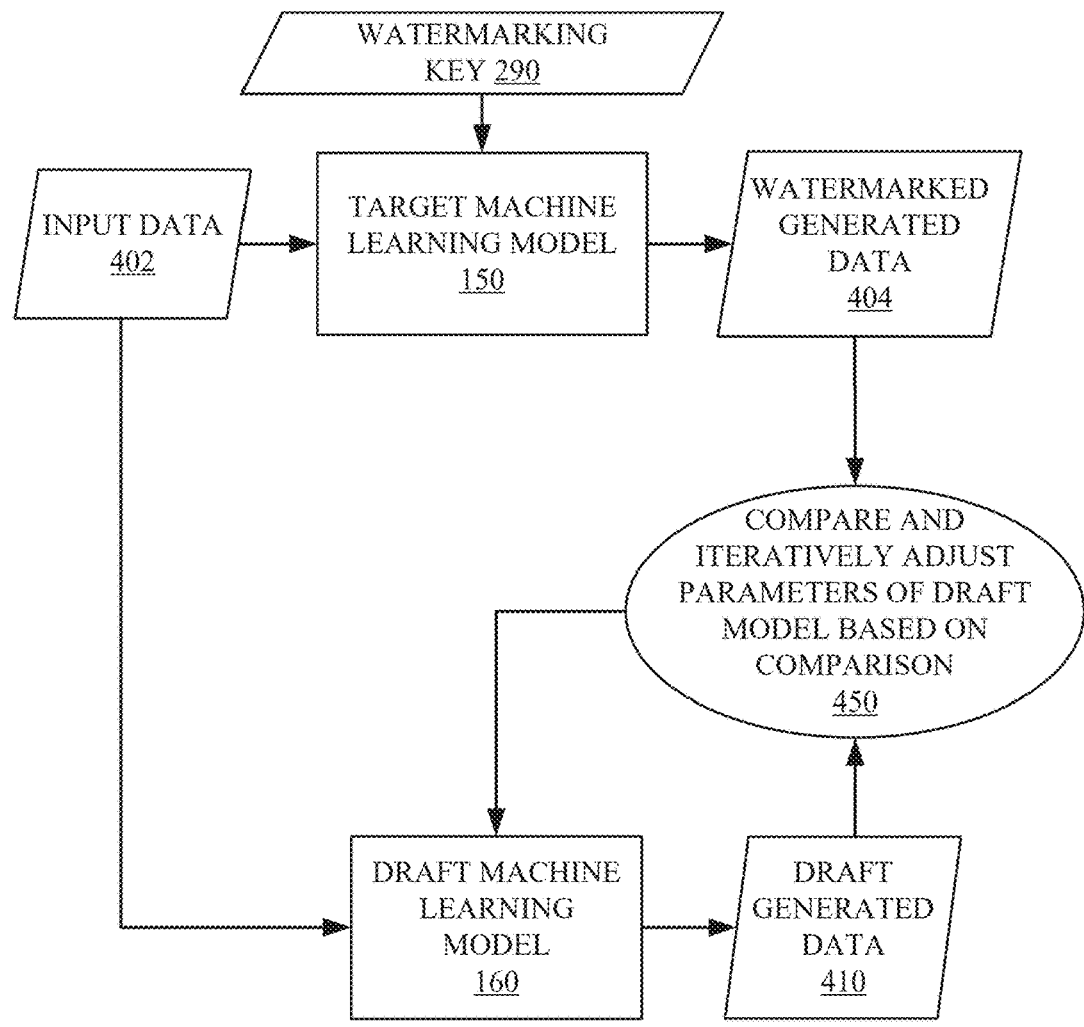
FIG. 4

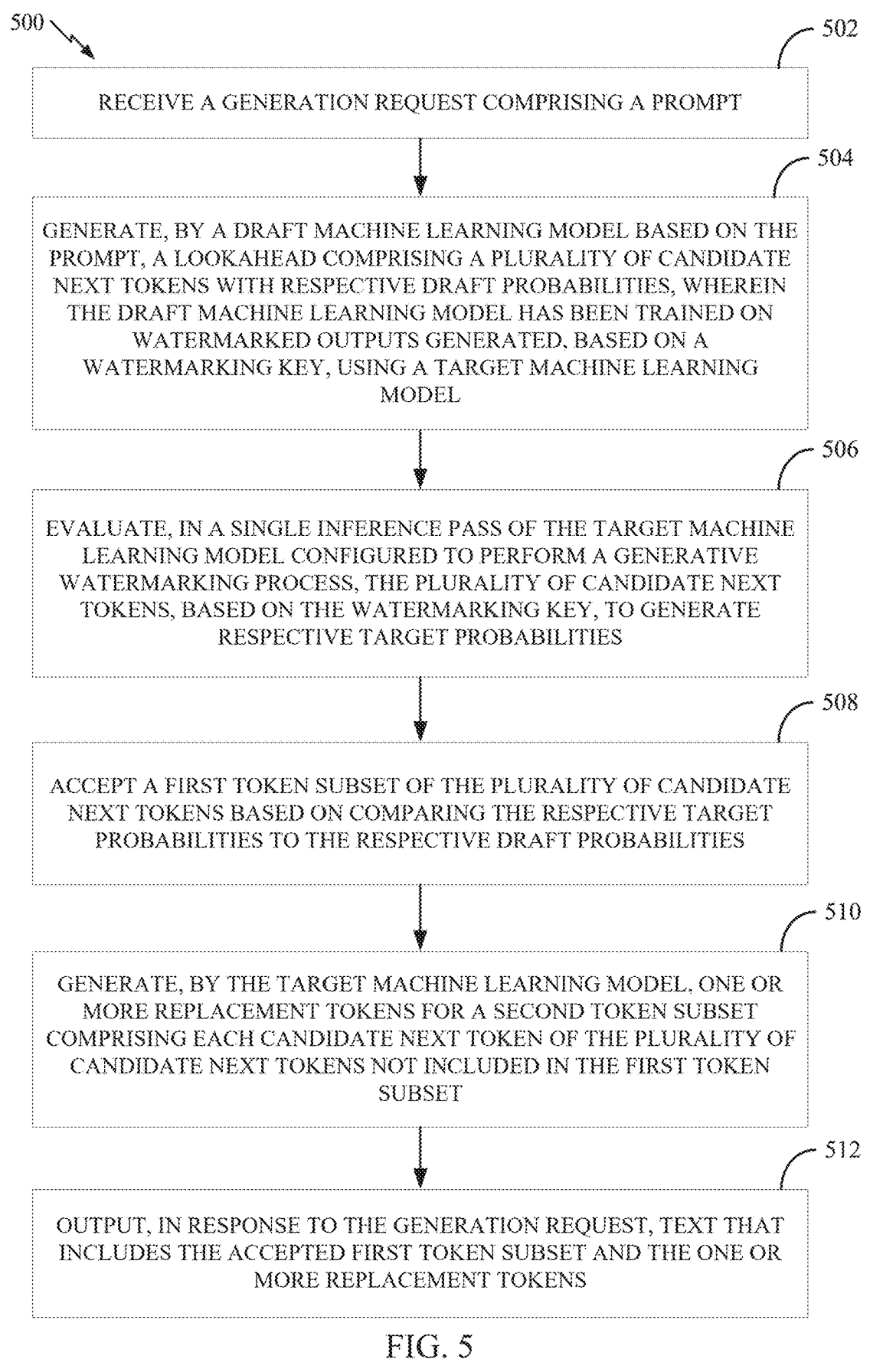

500

502

RECEIVE A GENERATION REQUEST COMPRISING A PROMPT

504

GENERATE, BY A DRAFT MACHINE LEARNING MODEL BASED ON THE PROMPT, A LOOKAHEAD COMPRISING A PLURALITY OF CANDIDATE NEXT TOKENS WITH RESPECTIVE DRAFT PROBABILITIES, WHEREIN THE DRAFT MACHINE LEARNING MODEL HAS BEEN TRAINED ON WATERMARKED OUTPUTS GENERATED, BASED ON A WATERMARKING KEY, USING A TARGET MACHINE LEARNING MODEL

506

EVALUATE, IN A SINGLE INFERENCE PASS OF THE TARGET MACHINE LEARNING MODEL CONFIGURED TO PERFORM A GENERATIVE WATERMARKING PROCESS, THE PLURALITY OF CANDIDATE NEXT TOKENS, BASED ON THE WATERMARKING KEY, TO GENERATE RESPECTIVE TARGET PROBABILITIES

508

ACCEPT A FIRST TOKEN SUBSET OF THE PLURALITY OF CANDIDATE NEXT TOKENS BASED ON COMPARING THE RESPECTIVE TARGET PROBABILITIES TO THE RESPECTIVE DRAFT PROBABILITIES

510

GENERATE, BY THE TARGET MACHINE LEARNING MODEL, ONE OR MORE REPLACEMENT TOKENS FOR A SECOND TOKEN SUBSET COMPRISING EACH CANDIDATE NEXT TOKEN OF THE PLURALITY OF CANDIDATE NEXT TOKENS NOT INCLUDED IN THE FIRST TOKEN SUBSET

512

OUTPUT, IN RESPONSE TO THE GENERATION REQUEST, TEXT THAT INCLUDES THE ACCEPTED FIRST TOKEN SUBSET AND THE ONE OR MORE REPLACEMENT TOKENS

FIG. 5

SPECULATIVE TEXTUAL WATERMARKING IN MACHINE LEARNING

INTRODUCTION

Aspects of the present disclosure relate to watermarking, and more specifically, to a process involving a dynamic combination of speculative decoding and generative watermarking with tournament sampling for resource efficient watermarked generative functionality.

BACKGROUND

Recent advances in artificial intelligence (AI) have enabled the widespread adoption of language processing machine learning models for the performance of natural language processing (NLP) tasks, such as generating text (e.g., synthetic text), answering user queries in a conversational manner, translating text from one language to another, and/or the like. A language processing machine learning model or "language model" is a type of machine learning (ML) model trained on large volumes of text to learn the structure, meaning, and usage patterns of language. Language models make it possible for software to "understand" typical human speech or written content and respond to it by, in some cases, generating human-understandable responses through natural language generation (NLG).

Generating text with a language model is an autoregressive process that involves the language model predicting a next token given an input sequence of tokens (e.g., in some cases, including token(s) that were previously predicted by the language model). More specifically, given an input sequence of tokens, a language model may assign probabilities to each candidate output token in its vocabulary, where a probability assigned to a candidate output token represents a likelihood that the candidate output token is most likely to logically follow next in the sequence. The language model may select the next token by sampling according to these probabilities. For example, the language model may select, as the next token in the sequence, a candidate output token associated with a greatest probability (e.g., indicating that the token is the most likely and appropriate next token in the sequence).

In the context of language models, "tokens" may refer to units of text that the models process and generate. Tokens can represent individual characters, words, subwords, or even larger linguistic units, depending on the specific tokenization (e.g., segmentation of text into meaningful units to capture its semantic and syntactic structure) approach used. Tokens act as a bridge between text data and the numerical representations that language models are able to use. A "candidate output token" refers to a token that may be generated by a language model as a potential next token in a text sequence.

Production deployments of language models sometimes rely on speculative decoding to reduce latency and cost. In speculative decoding, a smaller draft model proposes multiple "lookahead" tokens that are verified by a larger target model in a single forward pass, accepting the draft's proposals when consistent and generating replacements otherwise. This approach can substantially accelerate generation.

As synthetic text becomes pervasive and often indistinguishable from human-authored content, reliable attribution and detection mechanisms have grown in importance for safety, compliance, and accountability. Generative watermarking has emerged as a promising approach that embeds a statistical signature into text during the generation process, enabling subsequent detection without requiring access to the underlying model. To be practically useful, a watermark must preserve text quality, be robust to common decoding settings, and impose minimal computational overhead. However, existing watermarking techniques typically modify the generation process at a model, creating incompatibilities with certain other techniques, such as speculative decoding pipelines that depend on distributional consistency between draft proposals and target verification. Naively layering watermarking on top of speculative decoding can degrade watermark detectability, break non-distortion guarantees, or erode the acceptance rate that would otherwise drive efficiency gains in speculative decoding.

Accordingly, there is a need in the art for improved generative machine learning systems.

BRIEF SUMMARY

According to an aspect of the present disclosure, a method for watermark-preserving speculative content generation is provided. The method may include: receiving a generation request comprising a prompt; generating, by a draft machine learning model based on the prompt, a lookahead comprising a plurality of candidate next tokens with respective draft probabilities, wherein the draft machine learning model has been trained on watermarked outputs generated, based on a watermarking key, using a target machine learning model; evaluating, in a single inference pass of the target machine learning model configured to perform a generative watermarking process, the plurality of candidate next tokens, based on the watermarking key, to generate respective target probabilities; accepting a first token subset of the plurality of candidate next tokens based on comparing the respective target probabilities to the respective draft probabilities; generating, by the target machine learning model, one or more replacement tokens for a second token subset comprising each candidate next token of the plurality of candidate next tokens not included in the first token subset; and outputting, in response to the generation request, text that includes the accepted first token subset and the one or more replacement tokens.

According to an aspect of the present disclosure, a method for training a watermark-aware draft machine learning model is provided. The method may include: receiving a training configuration comprising a watermarking key and a set of training prompts; generating, by a target machine learning model configured to perform a generative watermarking process based on the watermarking key, a plurality of watermarked outputs for the set of training prompts; assembling a training corpus comprising, for each training prompt of the set of training prompts, the training prompt, a corresponding watermarked output of the plurality of watermarked outputs, the watermarking key, and one or more target distribution signals derived from the target machine learning model under the generative watermarking process; and training, using the training corpus, a draft machine learning model to predict, for lookahead positions, candidate next tokens with respective draft probabilities aligned to the distribution signals from the target machine learning model.

According to other aspects, a non-transitory computer readable medium may store instructions that, when executed by one or more processors of a computing system, cause the computing system to perform one or more of the methods set forth above. According to other aspects, a system includes one or more processors and a memory storing instructions that, when executed by the one or more processors, cause the system to perform aspects of one or more of the methods set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 4 illustrates an example workflow related to training a watermark-aware draft machine learning model, according to aspects of the present disclosure.

FIG. 5 illustrates example operations related to watermark-preserving speculative content generation, according to aspects of the present disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
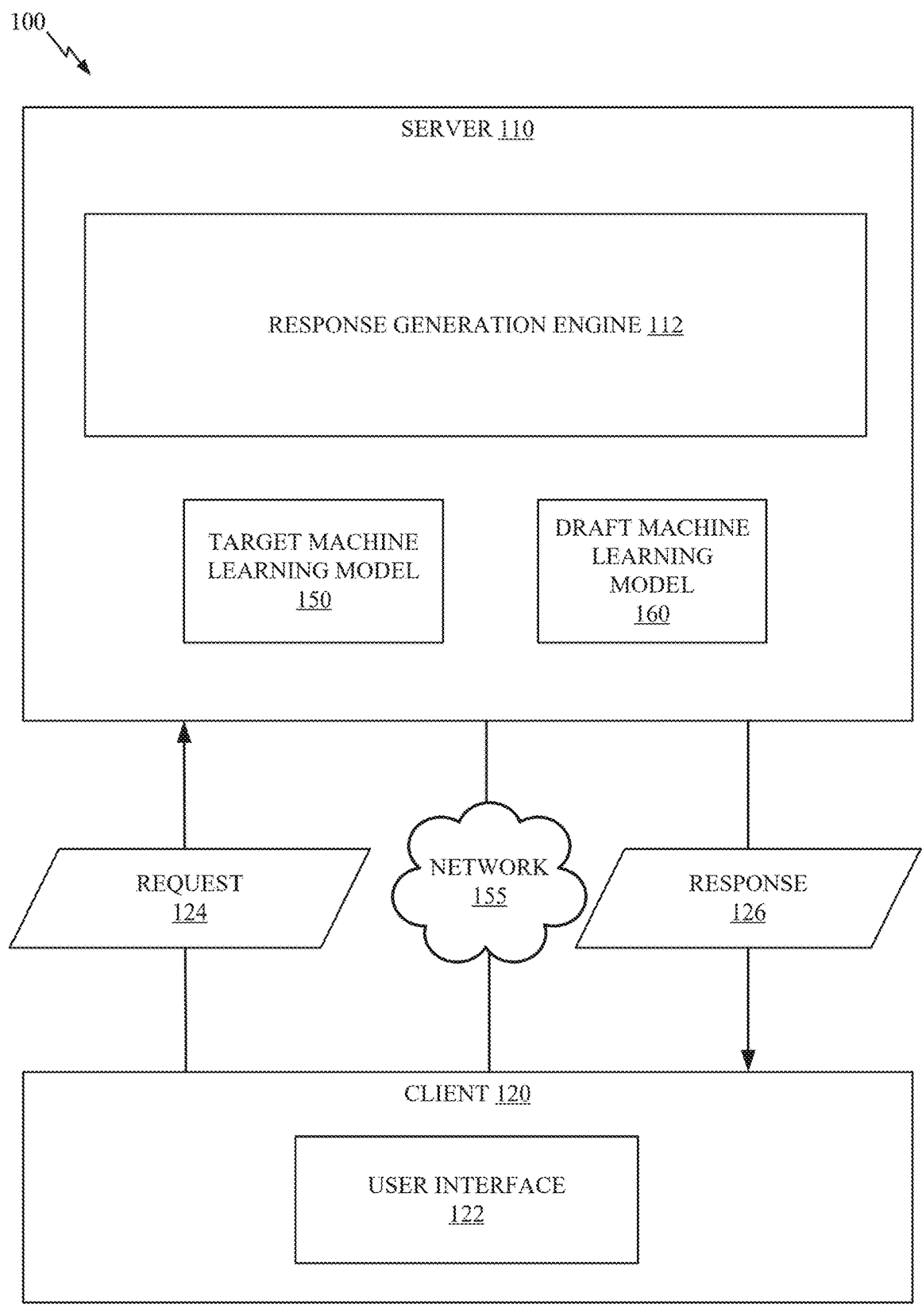
FIG. 1 illustrates a block diagram of a computing environment for watermark-preserving speculative content generation, according to aspects of the present disclosure.

The present disclosure relates to a method and system for watermark-preserving speculative content generation using language processing machine learning models. For example, in order to successfully integrate speculative decoding with watermarking techniques, aspects of the present disclosure involve training a draft machine learning model based on watermarked data produced using a target machine learning model such that the draft machine learning model is able to produce outputs that are watermarked in a similar manner to those produced by the target machine learning model.

The ability to reliably differentiate between different sources of content, including AI-generated text, is important across a wide range of contexts. Specifically, recognizing the origin of generated content may allow for the accurate identification of output produced by AI, a human, and/or another process. In some cases, such clarity may help to promote transparency by revealing the origin and/or method of production, which may help to reduce the risk of misinformation, error(s), and/or manipulation. In some cases, accountability may be strengthened by the ability to reliably trace outputs back to their source, thereby supporting responsible oversight (e.g., such as monitoring and managing processes to maintain quality and integrity) and/or regulatory compliance. Further, in some cases, trust may be fostered when the authenticity and origin of outputs can be verified. In summary, reliable differentiation underpins ethical and secure practices in any context where the attribution, integrity, and/or authenticity of outputs is important.

When the origin of content cannot be determined, there is a heightened risk of undesirable outcomes, such as misinformation, plagiarism, and/or fraudulent activity, among others. For instance, in an educational setting, undetected use of AI-generated essays may compromise academic integrity and hinder educators in assessing authentic student understanding and performance. Similarly, in online publishing, the inability to distinguish between human-written and AI-generated news articles may facilitate the spread of false information or manipulated narratives. In customer support or financial services, untraceable AI-generated responses may lead to errors or abuse, making it difficult to hold the correct party accountable for misleading and/or harmful advice. In creative industries, such as art or music, the lack of reliable attribution may result in unauthorized use or misrepresentation of original works, undermining the value and rights of creators.

One solution used to reliably differentiate between sources of content, particularly in the context of AI-generated outputs, is watermarking. "Watermarking" refers to a process that involves superimposing or embedding an invisible or visible identifier, or "watermark," into content. A watermark (also referred to herein as a "watermark signal" or simply as a "mark") may serve to indicate the origin of the content, authenticate its source, and/or provide a means for later detection and verification. Example watermarks may include digital signatures embedded in text, imperceptible patterns in images, and/or audio signals in sound files, each intended to enable the later identification of the content's source or origin without noticeably affecting the quality and usability of the content. As AI-generated content becomes more prevalent, watermarking is increasingly adopted to address challenges in attribution and provenance across various applications.

Generative watermarking with tournament sampling is one example approach that may be used to watermark AI-generated text, such as text generated by a language model. For example, a language model may select a next token for an input sequence of tokens by comparing candidate output tokens for the input sequence of tokens over a number of tournaments (e.g., to identify a single winning candidate output token). To embed a watermark during this process, binary watermarking scores may be assigned to each candidate output token during each tournament using pseudo-random function(s). The pseudo-random function(s) may be conditioned on a watermarking key (e.g., a secret value used to seed or condition the pseudo-random function so only those with the key can detect or reproduce the watermark) and recent context (e.g., the sequence of tokens immediately preceding the current generation step, used by the model to decide the next token) in the input sequence of tokens such that the assigned scores comprise deterministic but seemingly random values (e.g., appear random to others who are not in possession of the watermarking key). During each tournament, the token selection process is subtly biased in favor of candidate output tokens with higher binary watermarking scores. Thus, the final candidate output token selected at the end of performing the fixed number of tournaments comprises a token that logically follows the input sequence of tokens and encodes the watermark. The process is designed to be non-disruptive to text quality and scalable for production use, allowing for later detection of the watermark to verify whether a given text was generated by the language model. Tournament sampling may be performed with a fixed depth (e.g., a fixed number of tournaments) or with adaptive tournament sampling (e.g., involving dynamically determining the number of tournaments based on one or more factors such as the entropy of a language model's predicted, token-level probability distribution, such as at each token generation step).

Conventional watermarking techniques, such as generative watermarking with tournament sampling, are not compatible with conventional speculative decoding techniques. Speculative decoding processes generally involve a draft model and a target model. The draft model is generally smaller than the target model (e.g., the draft model may have fewer tunable parameters than the target model). Thus, the draft model may be faster and require fewer resources (e.g., energy and computational capacity) to operate than the target model. Because the target model is larger, the target model is typically more accurate than the draft model. The smaller draft model may be used to generate tokens of a response, and the larger target model may be used to verify the tokens generated by the draft model. If the target model determines that the tokens generated by the draft model are incorrect, the target model may generate tokens for the response. Because verifying tokens using the target model may require significantly less latency and resource consumption than generating tokens with the target model, speculative decoding may significantly reduce the overall latency and resource consumption of generative machine learning systems. However, if a target model has been configured to produce watermarked outputs according to a watermarking technique, a conventional draft model cannot be used to generate some or all of the outputs in a speculative decoding process involving such a target model, as the draft model will not produce outputs that are watermarked in a similar manner.

The present disclosure makes AI-generated content both traceable and fast to produce by synthesizing two previously conflicting techniques: watermarking, which embeds a statistical signature to identify AI-generated text later, and speculative decoding, which speeds up text generation by having a small draft model propose multiple next tokens and a larger target model validate them in a single pass. Historically, watermarking alters token sampling in a way that disrupts the distributional consistency needed for speculative decoding to be efficient. If watermarking is layered on naively, systems often lose speed, degrade watermark detection reliability, or both. Techniques described herein resolve this conflict by training the draft model on outputs produced by the target model while watermarking is active and keyed, making the draft model's proposals "watermark-aware." The target model continues applying its standard watermarking process and settings, preserving watermark guarantees, while it validates multiple candidate tokens in a single, vectorized pass, accepting tokens whose target probabilities match or exceed the draft's and regenerating only the remainder.

Technically, aspects of the present disclosure achieve speculative decoding speed and resource-efficiency while simultaneously ensuring watermarking consistency by aligning the draft model's proposals with the target model's watermarked distribution. This alignment drives a higher acceptance rate, which is the central lever for speculative decoding efficiency. Because the target model's non-distortion watermarking configurations remain intact, techniques described herein avoid quality losses seen in prior techniques. Single-pass verification reduces latency relative to stepwise generation, and the method operates robustly with standard decoding settings such as temperature and top-k/top-p, allowing straightforward integration into production pipelines. Aspects of the present disclosure may also involve storing compact metadata, such as key identifiers, acceptance masks, and seeds, enabling later verification without rerunning the larger target model. Additionally, aspects of the present disclosure support adaptive performance controls in which the lookahead length is selected based on estimated acceptance rates or latency budgets to meet different service goals.

In practice, techniques described herein maintain the substantial latency and cost savings of speculative decoding while ensuring that generated content carries a detectable signature that supports compliance, provenance, and misuse deterrence. By preserving output quality and relying on standard language model components and settings, aspects of the present disclosure are readily deployable at scale. By training a watermark-aware draft model and keeping the target model's watermarking intact for use in efficient validation and replacement token generation, the disclosed approach delivers watermarked outputs at speculative-decoding speeds, achieving a balance that prior techniques have not realized without tradeoffs in performance, detectability, or quality.

Example Computing Components Related to Watermark-Preserving Speculative Content Generation FIG. 1 illustrates a block diagram of a computing environment 100 related to watermark-preserving speculative content generation using language processing machine learning models. The computing environment 100 may include a server 110 and a client 120 connected via a network 155.

Server 110 may comprise one or more processors and a memory storing instructions. In some cases, server 110 may be an application server or other computing device that hosts a computing application accessed by one or more users, such as via user interface 122 on client 120.

The client 120 be a computing device by which a user interacts with a computing application, and may include a user interface 122 that enables such interaction. The client 120 may send a request 124 through the network 155 to the server 110, and may receive a response 126 back through the network 155 in response. For example, request 124 may be a request for information, to perform an operation, and/or the like, such as based on input provided by a user interacting with user interface 122 (e.g., selecting a user interface element, providing natural language input, and/or the like).

Server 110 may generate response 126 (e.g., in response to request 124) through a process that involves watermark-aware speculative decoding by response generation engine 112, using target machine learning model 150 and draft machine learning model 160. As described in more detail below with respect to FIG. 4, target machine learning model 150 may be configured to produce watermarked outputs according to a watermarking technique, and draft machine learning model 160 may have been trained based on watermarked outputs generated using target machine learning model 150.

In various aspects, response generation engine 112 orchestrates receipt, processing, and fulfillment of a natural-language generation request by coordinating a draft machine learning model 160 and a target machine learning model 150. Request 124 may include a prompt and, in some aspects, may include or be associated with optional configuration parameters such as decoding settings, latency budgets, a key identifier for watermark management, and/or the like.

Upon receipt of request 124, response generation engine 112 may authenticate the request, resolve the applicable watermarking key from secure storage, and construct a runtime configuration that specifies a lookahead length, sampling parameters, and verification criteria.

Response generation engine 112 may initialize a generation state that contains the prompt tokens, a cursor position, and one or more buffers for accepted tokens, rejected positions, and replacement tokens. Response generation engine 112 may then invoke draft machine learning model 160 to produce a lookahead comprising multiple candidate next tokens and associated probabilities (which may be referred to as draft probabilities due to their being generated by the draft model) conditioned on the prompt (e.g., in request 124) and the current generation state. The draft machine learning model 160 may be smaller than target machine learning model 150, and may be optimized for low-latency inference. In some implementations draft machine learning model 160 has been trained to approximate the output distribution of the target machine learning model 150 when target machine learning model 150 operates under a watermarking process keyed by the resolved watermarking key, thereby biasing the proposed tokens generated by draft machine learning model 160 toward distributions that are more likely to be validated subsequently by target machine learning model 150.

Having received the draft proposals from draft machine learning model 160, response generation engine 112 may perform a single verification step using target machine learning model 150. For example, response generation engine 112 may submit the prompt (e.g., from request 124) and the candidate tokens (from draft machine learning model 160) to target machine learning model 150, which may computes, in one forward pass, probabilities (which may be referred to as target probabilities due to their being generated by the target model) for each of the candidate tokens in its given proposed position under a generative process that includes watermark application based on the watermarking key. The response generation engine 112 may then compare, position by position, the target probabilities to the corresponding draft probabilities, and may compute an acceptance mask indicating which positions meet a threshold acceptance criterion. In a typical configuration a proposed token is accepted when its target probability is greater than or equal to its corresponding draft probability. Accepted tokens may be appended to the output buffer in the original order of the lookahead.

For each position that fails the acceptance criterion (e.g., where the token's target probability is less than its corresponding draft probability), response generation engine 112 may request generation of replacement tokens by target machine learning model 150. For example, response generation engine 112 may advance the generation state to the first rejected position and direct target machine learning model 150 to generate a token at that position using the same decoding configuration and watermarking process employed during verification. If multiple positions were rejected, response generation engine 112 may iteratively generate tokens for those positions until the lookahead segment is fully resolved or an end-of-sequence condition is reached. In all cases, tokens produced by target machine learning model 150 during replacement correspond to the watermark properties and decoding constraints used during verification to maintain consistency and detectability guarantees.

Response generation engine 112 may record compact metadata throughout inference to facilitate observability and downstream verification. The metadata can include, for example, the key identifier for the watermarking key, the acceptance mask for each lookahead, the decoding configuration used by target machine learning model 150, and/or any random seeds employed by the watermarking process. In some aspects, response generation engine 112 associates this metadata with response 126 to enable later watermark detection or auditing without requiring re-execution of target machine learning model 150.

Response generation engine 112 may trigger background retraining or recalibration tasks when persistent acceptance degradation is observed across sessions, thereby restoring alignment between the models.

Upon completion of text generation, response generation engine 112 may finalize response 126 (e.g., including any accepted tokens from the draft model and any generated replacement tokens from the target model). In some aspects, response 126 is packaged together with any requested explanations, cost and latency metrics, metadata, and/or the like. Response 126 may then be transmitted to client 120 and, in some aspects, logged to a persistent store for auditing, analytics, or future training. Through the coordinated operation of draft machine learning model 160 (trained based on watermarked outputs from target machine learning model 150) for low-cost proposal and target machine learning model 150 for single-pass verification and watermark-consistent replacement, response generation engine 112 delivers watermarked text with reduced latency and resource consumption while preserving detection and quality guarantees.

Example Watermark-Preserving Speculative Content Generation Workflows

Figure 2:
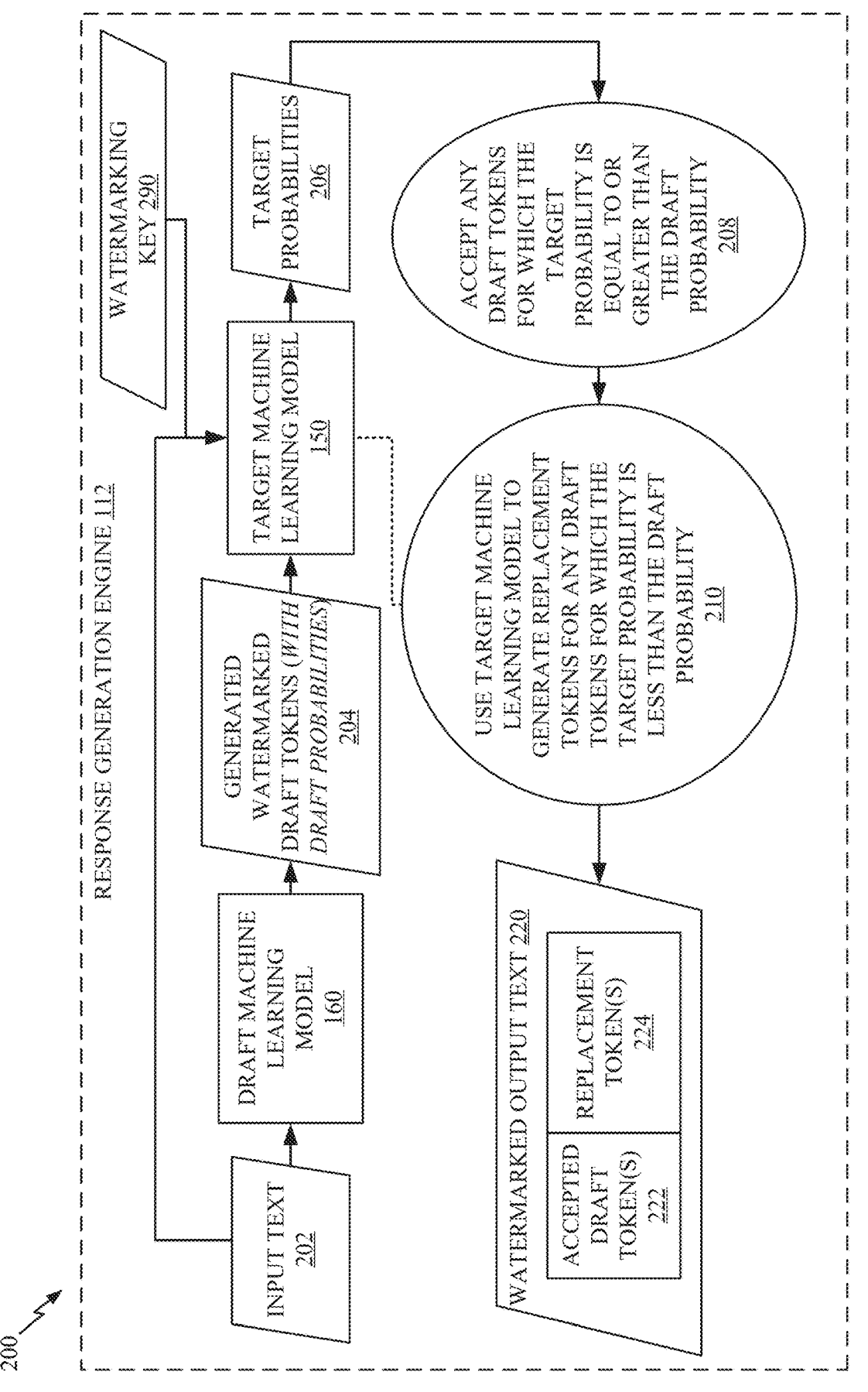
FIG. 2 is a block diagram illustrating a workflow related to watermark-preserving speculative content generation, according to aspects of the present disclosure.

FIG. 2 is a block diagram 200 illustrating a workflow related to watermark-preserving speculative content generation, according to aspects of the present disclosure. Block diagram 200 includes response generation engine 112, draft machine learning model 160, and target machine learning model 150 of FIG. 1.

The workflow may begin with input text 202, which represents prompt tokens derived from a user request (e.g., request 124 of FIG. 1). Draft machine learning model 160 receives input text 202 and outputs a lookahead of multiple candidate next tokens together with draft probabilities. In FIG. 2, these proposals are labeled generated watermarked draft tokens 204 to indicate that the draft model has been trained on watermarked outputs and therefore proposes tokens aligned with the watermark signal. The same decoding settings used by the target model (e.g., temperature, top-k, or top-p) may be applied by draft machine learning model 160 so that the draft probabilities are comparable to target probabilities.

The candidate tokens and their positions may then be evaluated by target machine learning model 150 in a single forward pass in which target machine learning model 150 is configured to apply a generative watermarking process driven by a watermarking key 290. In some embodiments the watermarking process uses tournament sampling across multiple pseudo-randomized layers and optional context masking (e.g., to preserve non-distortion properties). The result of this pass may be a set of target probabilities 206, one for each proposed token at its proposed position.

Response generation engine 112 may compare, position by position, the target probabilities 206 with the corresponding draft probabilities from 204 using an acceptance criterion, such as accepting any draft tokens for which the target probability is equal to or greater than the draft probability (at block 208). These accepted positions may be appended to the output sequence as accepted draft token(s) 222, such as in positions within the output sequence that correspond to the original positions of accepted draft token(s) 222 in generated watermarked draft tokens 204. For positions that fail the criterion, response generation engine may, at block 210, invoke target machine learning model 150 to generate replacement token(s) 224 under the same watermarking configuration and decoding settings used during verification. This propose-verify-replace loop ensures that accepted tokens preserve the watermark guarantees while only the rejected positions are regenerated by the target model.

The accepted draft tokens 222 and the replacement tokens 224 may be combined, in original lookahead order, to form watermarked output text 220. Throughout the process response generation engine 112 can record compact metadata such as a key identifier for the watermarking key 290, the acceptance mask, and/or any random seeds to support later watermark detection without re-executing the target model. In some implementations the lookahead length is configurable and can be adapted based on an observed acceptance rate or a latency budget, thereby maintaining high throughput while the target model enforces watermark integrity. FIG. 2 therefore illustrates how the engine coordinates a watermark-aware draft model for fast proposals and a watermark-applying target model for single-pass verification and selective regeneration to deliver response text that is both watermarked and efficiently generated.

Figure 3:
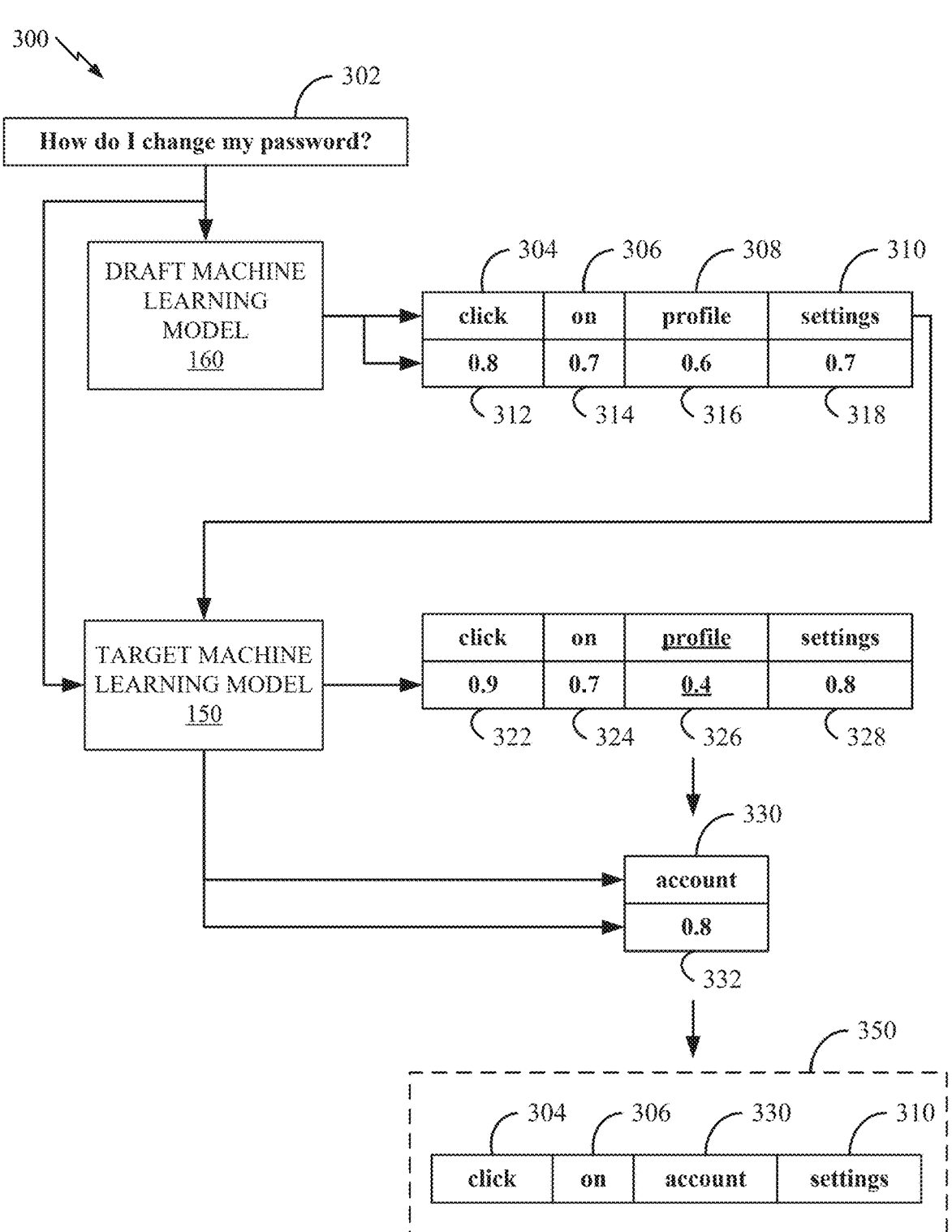
FIG. 3 is a block diagram illustrating a workflow related to watermark-preserving speculative content generation, according to aspects of the present disclosure.

FIG. 3 is a block diagram 300 illustrating a workflow related to watermark-preserving speculative content generation, according to aspects of the present disclosure. Block diagram 300 may relate to functionality performed by response generation engine 112 of FIG. 1, such as providing additional detail with respect to the workflow described above with to FIG. 2.

For example, block diagram 300 may illustrate a stepwise example of watermark-preserving speculative generation in which a draft machine learning model 160 proposes a multi-token lookahead that is verified by a target machine learning model 150 operating under a generative watermarking process keyed by a watermarking key. The workflow begins when a request including a natural-language prompt 302 is received by a response pipeline. The prompt 302 (e.g., including the text "How do I change my password?") may be tokenized and provided to the draft machine learning model 160, which may output a lookahead comprising several candidate next tokens 304, 306, 308, and 310 along with respective draft probabilities 312, 314, 316, and 318 for the proposed positions. In the illustrative sequence, four candidate tokens (click, on, profile, and settings) are proposed for consecutive positions with corresponding draft probabilities of 0.8, 0.7, 0.6, and 0.7, respectively.

The same prompt 302 and the proposed tokens 304, 306, 308, and 310 may then be submitted, as a batch, to the target machine learning model 150. In a single forward pass that applies the watermarking process (e.g., tournament sampling with key-conditioned pseudo-random layers and optional context masking), the target machine learning model 150 may compute target probabilities for each proposed token at its proposed position. In the example, the target probabilities 322, 324, 326, and 328 are 0.9, 0.7, 0.4, and 0.8, respectively. A positional acceptance mask may be computed by comparing the distributions such that each proposed token is accepted if its target probability is greater than or equal to its draft probability and is otherwise rejected. Thus, the first, second, and fourth positions may be accepted ($0.9 \geq 0.8$, $0.7 \geq 0.7$, and $0.8 \geq 0.7$), while the third position is rejected ($0.4 < 0.6$). Accordingly, tokens 304, 306, and 310 (click, on, and settings) may be accepted while token 308 (profile) may be rejected (e.g., because target probability 326 is less than draft probability 316).

For each rejected position, the target machine learning model 150 may generate a replacement token under the same watermarking configuration and decoding settings used during verification, thereby preserving watermark detectability and non-distortion properties. Continuing the example, the third position (previously containing token 308) is regenerated by the target machine learning model 150, which produces a replacement token 330 (e.g., account, which may be associated with a target probability 332 of 0.8). The response pipeline assembles the final output 350 by interleaving the accepted draft tokens 304, 306, and 310 with the replacement token(s) (in this case including token 330) in original lookahead order, yielding a coherent watermarked sequence ("click on account settings"). Output 350 may be provided as a response to the input query that included prompt 302, such as via a user interface.

The depicted flow demonstrates the technical advantages accomplished by techniques described herein. For example, a single, vectorized verification pass by the target machine learning model 150 maintains watermark guarantees while the acceptance of most positions (e.g., due to the draft model having been trained based on watermarked outputs generated using the target model) retains speculative-decoding speed. In the depicted example, only the minority of positions are rejected and result in invocation of the target machine learning model 150, thereby reducing latency and compute cost without compromising watermark integrity or output quality.

*Example Model Training Process*

FIG. 4 is a block diagram 400 illustrating an example workflow related to training a watermark-aware draft machine learning model, according to aspects of the present disclosure. For example, block diagram 400 includes target machine learning model 150 and draft machine learning model 160 of FIG. 1 and watermarking key 290 of FIG. 2, and may relate to the training of draft machine learning model 160.

Each of target machine learning model 150 and draft machine learning model 160 may be a language processing machine learning model, such as a large language model (LLM) or a small language model. In one example, target machine learning model 150 and/or draft machine learning model 160 may be a transformer model. Target machine learning model 150 may have a larger number of tunable parameters than draft machine learning model 160. For example, draft machine learning model 160 may be a lightweight model that is configured to produce draft tokens for validation by target machine learning model 150, which may be a larger and more robust model.

"Learnable parameters" or "tunable parameters" of a neural network (e.g., target machine learning model 150 and draft machine learning model 160 may be neural networks) may include internal values, such as weights and biases, that are automatically adjusted during training. Tunable parameters may be updated through optimization algorithms (e.g., such as gradient descent) to minimize a loss function and improve the neural network's performance on a given task. Unlike hyperparameters, which are set before training, tunable parameters may be directly modified by the neural network as it learns from data.

Target machine learning model 150 may have been trained in advance, such as based on a large corpus of natural language data, and may be configured to perform a watermarking generative process. In one example, target machine learning model 150 is configured to perform generative watermarking with adaptive tournament sampling, which may involve performing a total number of tournaments that is equal to the watermarking depth, to embed a statistical watermark in a candidate output token. For example, in a first tournament (e.g., an initial tournament), a first set of binary watermarking scores may be assigned to the candidate output tokens (e.g., in the vocabulary of the model) using a pseudo-random function that incorporates a watermarking key (e.g., watermarking key 290) and recent context of the input token sequence. All candidate output tokens may be paired, and within each pair, the candidate output token with the higher binary watermarking score may advance to the next tournament. The candidate output tokens that advance to the next tournament may form a new pool of candidate output tokens, referred to herein as the "current pool of candidate output tokens."

For each subsequent tournament, new binary watermarking scores may be assigned to, at least, the candidate output tokens in the current pool of candidate output tokens. The candidate output tokens in the current pool of candidate output tokens may again be paired, and for each pair, the candidate output token with the higher binary watermarking score may advance to the next tournament. The current pool of candidate output tokens may be updated to include the candidate output tokens that advance to the next tournament. This process may be repeated for the total number of tournaments specified by the watermarking depth.

A candidate output token remaining after the final tournament is performed may be selected as the output token by the model. This candidate output token may include a watermark that has been embedded (e.g., incrementally) in the candidate output token during each tournament of the multiple tournaments performed during generative watermarking with adaptive tournament sampling. It is noted that generative watermarking with adaptive tournament sampling is included as an example, and other types of watermarking techniques may be employed by target machine learning model 150.

The vocabulary of candidate output tokens may include a finite, defined set of tokens learned by target machine learning model 150 during training. Probability distributions output by target machine learning model 150 and draft machine learning model 160 may include a probability score assigned by the respective model to each candidate output token in the vocabulary. A probability score assigned to a particular candidate output token may represent a likelihood or confidence that the particular candidate output token is a most appropriate next token. Thus, the probability score assigned to a particular candidate output token may reflect both the syntactic and semantic relevance of the particular candidate output token to the input token sequence.

The same decoding settings used by the target model 150 (e.g., temperature, top-k, top-p, and/or the like) may be applied by draft machine learning model 160 so that the draft probabilities are comparable to target probabilities.

During the training process for draft machine learning model 160, the target machine learning model 150 may processes input data 402 according to a generative watermarking procedure keyed by watermarking key 290 to produce watermarked generated data 404. Input data 402 may represent a set of training prompts, which may include natural-language instructions, domain-specific queries, and/ or the like. In some aspects, the generative watermarking procedure implements tournament sampling across multiple pseudo-randomized layers such that the statistical signature is embedded without materially distorting text quality.

The watermarked generated data 404 serves as labels associated with input data 402 in a supervised training process for draft machine learning model 160. For example, draft machine learning model 160 may generate draft generated data 410 based on input data 402, and a comparison stage 450 may involve eGvaluating divergence between draft generated data 410 and watermarked generated data 404 (e.g., via evaluation of a loss function) and iteratively adjusting parameters of draft machine learning model 160 based on that comparison. The comparison stage 450 may consume target distribution signals derived from the target machine learning model 150 under watermarking, such as logits, temperature-normalized probabilities, per-position acceptance masks for lookahead proposals, and tournament-layer assignments. A loss function employed during training of draft machine learning model 160 can include next-token cross-entropy against the target's probabilities, Kullback-Leibler divergence to align distributions, entropy control to match calibration, auxiliary losses to reproduce acceptance patterns for speculative lookaheads, and/or the like.

During training, draft machine learning model 160 can be conditioned on the watermarking key 290 as a result of being trained on watermarked generated data 404 (e.g., generated based on watermarking key 290) so that the draft learns the key-specific watermark behavior of the target machine learning model 150. A defined decoding configuration, such as temperature, top-k or top-p, repetition penalties, and/or maximum lookahead length, may be held consistent with the configuration intended for inference (e.g., employed by target machine learning model 150 and draft machine learning model 160) so the learned distributions remain comparable during later verification.

In some aspects, the draft machine learning model is configured based on per-key adapters or per-key embeddings that parameterize the model's watermark behavior for a given watermarking key, enabling the model to express key-specific distributional alignment. For example, certain aspects support multiple watermarking keys concurrently via runtime resolution, wherein a key identifier included in a generation request or retrieved according to a policy determines which adapter module or embedding vector, or otherwise which version of the draft model, is activated for inference and verification alignment. To minimize operational cost, lightweight offline training and/or fine-tuning may be performed per watermarking key using techniques such as low-rank adaptation, adapter-based training, or key-specific training, on a limited corpus of target-model-generated watermarked outputs, thereby rapidly converging to high acceptance rates under the target model's watermarking process for particular watermarking keys. During and after calibration, the system may store key-specific calibration metadata, including key identifiers, adapter version identifiers, temperature and sampling settings, probability calibration statistics, recent acceptance-rate summaries, and/or the like, so that at inference time the appropriate per-key parameters and normalization factors are applied to keep the draft probabilities comparable to the target model's watermarked probabilities.

The loop depicted in block diagram 400 may repeat until one or more convergence criteria are met, for example when a validation set indicates that the draft achieves a target acceptance metric, such relating to model accuracy. Upon convergence, trained parameters of draft machine learning model 160 may be stored together with metadata that can include a key identifier corresponding to the watermarking key 290, the decoding configuration used during supervision, calibration statistics, the measured acceptance metric, and/or the like. The resulting draft machine learning model 160 is thereby prepared for deployment in a speculative decoding pipeline where it proposes watermark-aligned lookaheads that the target machine learning model 150 can validate in a single pass, preserving watermark guarantees while enabling low-latency generation.

Watermarked data generated using target machine learning model 150 and/or draft machine learning model 160 (e.g., in a speculative decoding process described herein) may contain watermarks that can be detected through a watermark detection process.

In certain aspects, detection may be performed on an output token sequence with embedded watermarks in order to verify the presence of the watermarks. Thus, detection may enable reliable identification of content produced by a model. This process for detection may include analyzing the output token sequence with embedded watermarks to identify the embedded watermarks, which may have been incrementally introduced during a generative process described herein. Detection for output tokens in the output token sequence with embedded watermarks may be accomplished without access to the underlying model(s) or the internal parameters of such model(s), relying instead on the reproducibility of the binary watermarking scores when the watermarking key and recent context are known. For example, a detection algorithm may re-apply pseudo-random scoring functions to the output token and evaluate whether a resulting statistical pattern matches what is expected from a watermarked sequence.

One application that may perform detection includes an educational platform that needs to distinguish between human and AI-generated responses. Another example application that may perform detection includes a publishing system that requires content attribution.

In certain aspects, detection 220 be performed within a tax domain. For example, in certain applications, such as tax preparation software, the ability to detect and confirm the presence of a statistical watermark in generated text, such as during detection, may be particularly valuable. For example, a company may offer tax software that utilizes a language model for generating tax outputs, which are then subsequently used to complete tax forms. However, a user may choose to rely on an output produced by a different language model (e.g., third-party software) and submit a tax output from this model through the tax software. In such cases, the company may need to verify whether the tax output being relied upon in the tax form was generated by its own language model or by an external source. By embedding a detectable watermark in its output, the company may be able to confirm the origin of the output is not from the company when the watermark is not detected in the output, thereby demonstrating that the information relied on in the tax form was not produced by its system. This capability helps to clarify responsibility, support proper attribution, and ensures the company is not held liable for tax advice or calculations generated by the third-party model.

In certain aspects, an input token sequence is associated with a user query for a tax domain, and the output token sequence with embedded watermarks represents a response to the user query for the tax domain, generated as output by a speculative decoding process involving draft machine learning model 160 and target machine learning model 150 and including embedded watermark(s).

Example Operations Related to Watermark-Preserving Speculative Content Generation FIG. 5 illustrates a flowchart of operations 500 for watermark-preserving speculative content generation, according to aspects of the present disclosure. For example, operations 500 may be performed by one or more components described herein, such as response generation engine 112 of FIG. 1 and/or one or more components of FIGS. 6A and/or 6B described below.

Operations 500 may begin at step 502, with receiving a generation request comprising a prompt.

Operations 500 may continue at step 504, with generating, by a draft machine learning model based on the prompt, a lookahead comprising a plurality of candidate next tokens with respective draft probabilities, wherein the draft machine learning model has been trained on watermarked outputs generated, based on a watermarking key, using a target machine learning model.

In some aspects, the draft machine learning model is trained on watermarked outputs generated by the target machine learning model using the watermarking key so as to approximate a distribution of the target machine learning model in connection with the generative watermarking process.

In certain aspects, the lookahead comprising the plurality of candidate next tokens has a configured length that is greater than one.

In certain aspects, the draft machine learning model generates the plurality of candidate next tokens using a same set of decoding settings as the target machine learning model so that the respective draft probabilities are comparable to the respective target probabilities, and the same set of decoding settings comprises one or more of: top-k sampling; top-p sampling; or temperature.

In some aspects, the draft machine learning model has fewer tunable parameters than the target machine learning model.

Operations 500 may continue at step 506, with evaluating, in a single inference pass of the target machine learning model configured to perform a generative watermarking process, the plurality of candidate next tokens, based on the watermarking key, to generate respective target probabilities.

In certain aspects, the generative watermarking process performed by the target machine learning model comprises tournament sampling across multiple layers using the watermarking key and repeated context masking.

In some aspects, the evaluating in a single inference pass comprises computing, in one forward pass of the target machine learning model, based on the prompt, a corresponding target probability of the respective target probabilities for each candidate next token of the lookahead.

Operations 500 may continue at step 508, with accepting a first token subset of the plurality of candidate next tokens based on comparing the respective target probabilities to the respective draft probabilities.

In certain aspects the accepting of the first token subset is based on determining, for each position of the lookahead, whether a corresponding respective target probability of the respective target probabilities is greater than or equal to a corresponding respective draft probability of the respective draft probabilities.

Operations 500 may continue at step 510, with generating, by the target machine learning model, one or more replacement tokens for a second token subset comprising each candidate next token of the plurality of candidate next tokens not included in the first token subset.

In some aspects, the generating of the one or more replacement tokens is performed by the target machine learning model using a same generative watermarking process as used to compute the respective target probabilities, thereby preserving watermark guarantees.

In some aspects the accepting the first token subset and the generating the one or more replacement tokens are performed positionally with respect to the lookahead such that accepted candidate next tokens are appended, and rejected positions are filled by the one or more replacement tokens, in an original order of the lookahead.

In certain aspects, the accepted first token subset comprises each candidate next token of the plurality of candidate next tokens for which a respective target probability of the respective target probabilities is greater than or equal to a respective draft probability of the respective draft probabilities, and the second token subset comprises each candidate next token of the plurality of candidate next tokens for which a respective target probability of the respective target probabilities is less than a respective draft probability of the respective draft probabilities.

Operations 500 may continue at step 512, with outputting, in response to the generation request, text that includes the accepted first token subset and the one or more replacement tokens.

In some aspects, the outputting of the text further comprises storing metadata in connection with the text to enable subsequent watermark detection without utilizing the target machine learning model.

Some aspects comprise training a watermark-aware draft machine learning model such as the draft machine learning model. For example, such aspects may include receiving a training configuration comprising a watermarking key and a set of training prompts and generating, by a target machine learning model configured to perform a generative watermarking process based on the watermarking key, a plurality of watermarked outputs for the set of training prompts. Such aspects may include assembling a training corpus comprising, for each training prompt of the set of training prompts, the training prompt, a corresponding watermarked output of the plurality of watermarked outputs, the watermarking key, and one or more target distribution signals derived from the target machine learning model under the generative watermarking process. Such aspects may include training, using the training corpus, a draft machine learning model to predict, for lookahead positions, candidate next tokens with respective draft probabilities aligned to the distribution signals from the target machine learning model.

Aspects may further include validating the draft machine learning model by computing, on a hold-out evaluation set, an acceptance metric that measures a proportion of candidate next tokens whose target probabilities from the target machine learning model according to the generative watermarking process are greater than or equal to corresponding draft probabilities from the draft machine learning model for a configured lookahead length, storing trained parameters of the draft machine learning model together with metadata comprising a key identifier for the watermarking key, and the acceptance metric, and deploying the draft machine learning model for use in watermark-preserving speculative text generation with the target machine learning model.

In some aspects, the target distribution signals comprise one or more of logits, probabilities, acceptance masks for lookahead positions, or tournament-layer assignments produced by the target machine learning model according to the generative watermarking process.

In some aspects, the training the draft machine learning model comprises optimizing a loss function that penalizes divergence from the target distribution signals for the lookahead positions.

In certain aspects, the draft machine learning model is configured with a same set of decoding settings as the target machine learning model.

In some aspects, the draft machine learning model has fewer tunable parameters than the target machine learning model.

Example Processing Systems

Figure 6A:
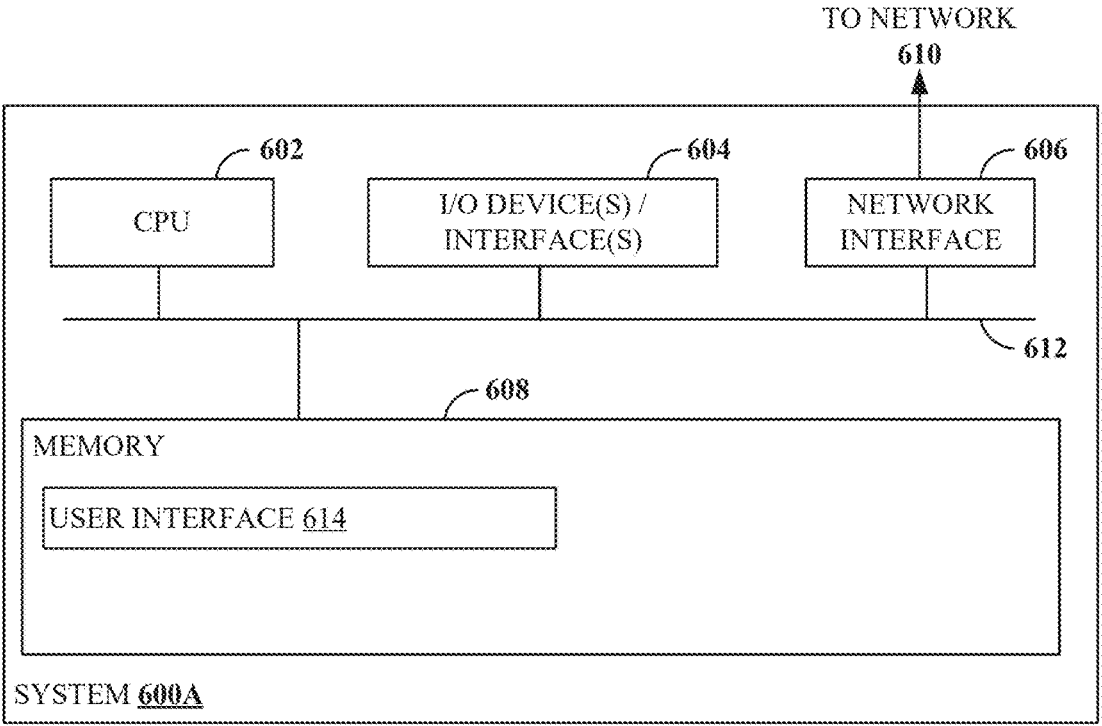
FIG. 6A and FIG. 6B illustrate block diagrams of two computing systems related to watermark-preserving speculative content generation, according to aspects of the present disclosure.

FIG. 6A illustrates an example system 600A with which embodiments of the present disclosure may be implemented. For example, system 600A may be configured to perform aspects of operations 500 of FIG. 5. In one example system 600A corresponds to client 120 of FIG. 1.

System 600A includes a central processing unit (CPU) 602, one or more I/O device interfaces 604 that may allow for the connection of various I/O devices (e.g., keyboards, displays, mouse devices, pen input, etc.) to the system 600A, network interface 606, a memory 608, and an interconnect 612. It is contemplated that one or more components of system 600A may be located remotely and accessed via a network 610. It is further contemplated that one or more components of system 600A may comprise physical components or virtualized components.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, and memory 608. CPU 602 is included to be representative of a single CPU, multiple CPUs, a single CPU having multiple processing cores, and other arrangements.

Additionally, the memory 608 is included to be representative of a random access memory or the like. In some embodiments, memory 608 may comprise a disk drive, solid state drive, or a collection of storage devices distributed across multiple storage systems. Although shown as a single unit, the memory 608 may be a combination of fixed and/or removable storage devices, such as fixed disc drives, removable memory cards or optical storage, network attached storage (NAS), or a storage area-network (SAN).

As shown, memory 608 includes a user interface 614, which may be representative of user interface 122 of FIG. 1. For example, a user may interact with user interface 614 to provide input text, submit input text, receive responses, provide feedback with respect to responses, perform other actions based on or in connection with input text and/or responses, and/or the like. For example, user feedback with respect to responses may be used to retrain one or more machine learning models through a supervised learning process for improved performance, such as draft machine learning model 658 and/or target machine learning model 656 of FIG. 6B.

Figure 6B:
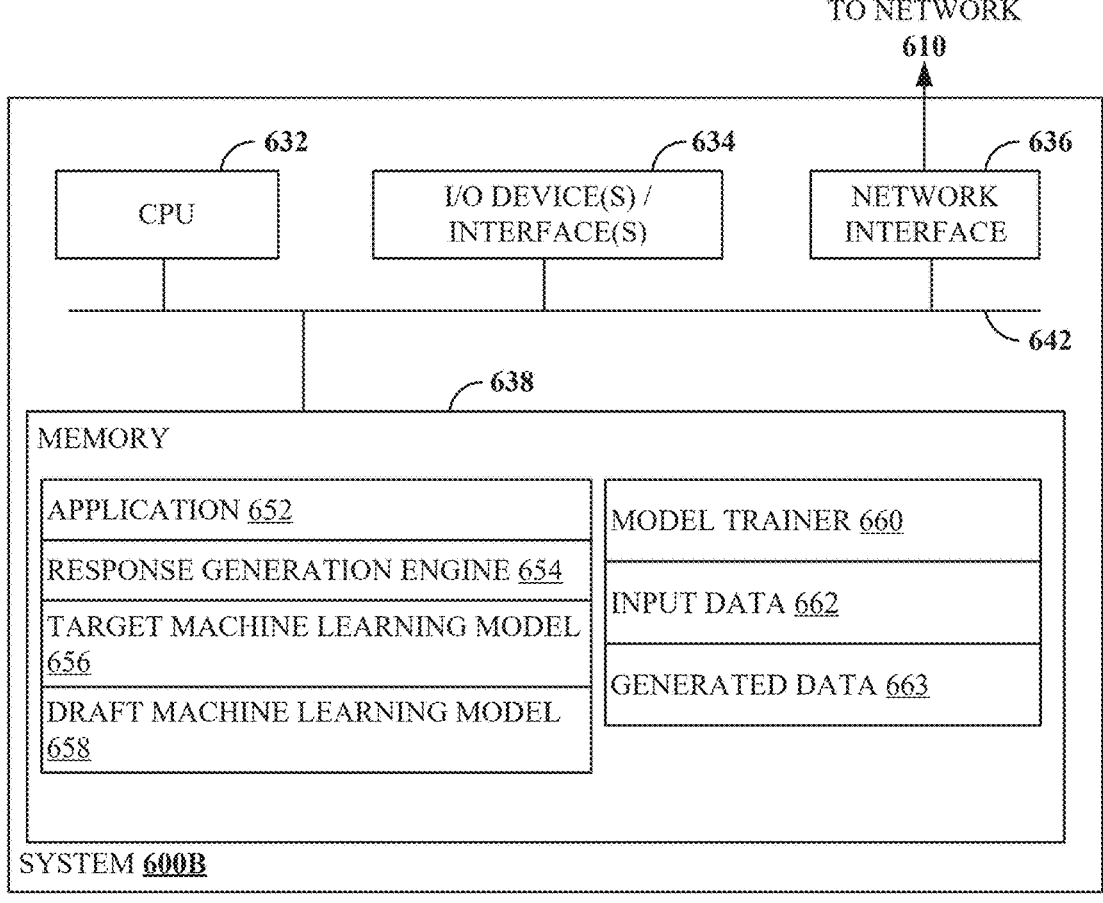

FIG. 6B illustrates another example system 600B with which embodiments of the present disclosure may be implemented. For example, system 600B may correspond to server 110 of FIG. 1, and may be configured to perform aspects of operations 500 of FIG. 5.

System 600B includes a CPU 632, one or more I/O device interfaces 634 that may allow for the connection of various I/O devices (e.g., keyboards, displays, mouse devices, pen input, etc.) to the system 600B, network interface 636, a memory 638, and an interconnect 642. It is contemplated that one or more components of system 600B may be located remotely and accessed via a network 610. It is further contemplated that one or more components of system 600B may comprise physical components or virtualized components.

CPU 632 may retrieve and execute programming instructions stored in the memory 638. Similarly, the CPU 632 may retrieve and store application data residing in the memory 638. The interconnect 642 transmits programming instructions and application data, among the CPU 632, I/O device interface 634, network interface 636, and memory 638. CPU 632 is included to be representative of a single CPU, multiple CPUs, a single CPU having multiple processing cores, and other arrangements.

Additionally, the memory 638 is included to be representative of a random access memory or the like. In some embodiments, memory 638 may comprise a disk drive, solid state drive, or a collection of storage devices distributed across multiple storage systems. Although shown as a single unit, the memory 638 may be a combination of fixed and/or removable storage devices, such as fixed disc drives, removable memory cards or optical storage, network attached storage (NAS), or a storage area-network (SAN).

As shown, memory 638 includes an application 652, which may be representative of a computing application that performs language processing functionality, such as an application that includes an AI-assisted conversational system, a chat bot, or the like. In some aspects, user interface 614 of FIG. 6A provides user interface screens corresponding to application 652.

As shown, memory 638 further includes response generation engine 654, target machine learning model 656, and draft machine learning model 658, which may be representative of response generation engine 112, target machine learning model 150, and draft machine learning model 160 of FIG. 1. In some aspects, response generation engine 654 may be part of application 652, or may be separate from application 652. Memory 638 may further include model trainer 660, which may perform aspects related to training target machine learning model 656 and/or draft machine learning model 658, such as one or more training processes described above (e.g., with respect to FIG. 4). In other aspects, model trainer 660 may be located and executed on a separate system from the system on which such machine learning model(s) are run for use in dynamic response generation.

Memory 638 may further include input data 662, which may include request 124 of FIG. 1, input text 202 of FIG. 2, natural-language prompt 302 of FIG. 3, input data 402 of FIG. 4, and/or the like. Memory 638 may further include generated data 663, which may include response 126 of FIG. 1, generated watermarked draft tokens 204, target probabilities 206, and/or replacement tokens 224 of FIG. 2, tokens 304, 306, 308, 310, and/or 330 and/or probabilities 312, 314, 316, 318, 322, 324, 326, 328, and/or 332 of FIG. 3, watermarked generated data 404 and/or draft generated data 410 of FIG. 4.

It is noted that systems 600A and 600B are included as examples, and certain functionality described with respect to systems 600A and/or 600B and/or otherwise described herein may be implemented via more or fewer devices and/or components.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system for watermark-preserving speculative text generation, comprising:

one or more processors; and a non-transitory computer readable medium storing instructions that, when executed by the one or more processors, cause the system to:

receive a generation request comprising a prompt;

generate, by a draft machine learning model based on the prompt, a lookahead comprising a plurality of candidate next tokens with respective draft probabilities, wherein the draft machine learning model has been trained on watermarked outputs generated, based on a watermarking key, using a target machine learning model;

evaluate, in a single inference pass of the target machine learning model configured to perform a generative watermarking process, the plurality of candidate next tokens, based on the watermarking key, to generate respective target probabilities;

accept a first token subset of the plurality of candidate next tokens based on comparing the respective target probabilities to the respective draft probabilities, wherein the accepted first token subset comprises each candidate next token of the plurality of candidate next tokens for which a respective target probability of the respective target probabilities is greater than or equal to a respective draft probability of the respective draft probabilities;

generate, by the target machine learning model, one or more replacement tokens for a second token subset comprising each candidate next token of the plurality of candidate next tokens not included in the first token subset, wherein the second token subset comprises each candidate next token of the plurality of candidate next tokens for which a respective target probability of the respective target probabilities is less than a respective draft probability of the respective draft probabilities; and output, in response to the generation request, text that includes the accepted first token subset and the one or more replacement tokens.

2. The system of claim 1, wherein the generative watermarking process performed by the target machine learning model comprises tournament sampling across multiple layers using the watermarking key and repeated context masking.

3. The system of claim 1, wherein the draft machine learning model is trained on watermarked outputs generated by the target machine learning model using the watermarking key so as to approximate a distribution of the target machine learning model in connection with the generative watermarking process.

4. The system of claim 1, wherein the evaluating in a single inference pass comprises computing, in one forward pass of the target machine learning model, based on the prompt, a corresponding target probability of the respective target probabilities for each candidate next token of the lookahead.

5. The system of claim 1, wherein the generating of the one or more replacement tokens is performed by the target machine learning model using a same generative watermarking process as used to compute the respective target probabilities, thereby preserving watermark guarantees.

6. The system of claim 1, wherein the lookahead comprising the plurality of candidate next tokens has a configured length that is greater than one.

7. The system of claim 1, wherein the outputting of the text further comprises storing metadata in connection with the text to enable subsequent watermark detection without utilizing the target machine learning model.

8. The system of claim 1, wherein the draft machine learning model generates the plurality of candidate next tokens using a same set of decoding settings as the target machine learning model so that the respective draft probabilities are comparable to the respective target probabilities, and wherein the same set of decoding settings comprises one or more of:

top-k sampling;

top-p sampling; or temperature.

9. The system of claim 1, wherein the accepting the first token subset and the generating the one or more replacement tokens are performed positionally with respect to the lookahead such that accepted candidate next tokens are appended, and rejected positions are filled by the one or more replacement tokens, in an original order of the lookahead.

10. The system of claim 1 wherein the accepting of the first token subset is based on determining, for each position of the lookahead, whether a corresponding respective target probability of the respective target probabilities is greater than or equal to a corresponding respective draft probability of the respective draft probabilities.

11. The system of claim 1, wherein the draft machine learning model has fewer tunable parameters than the target machine learning model.

12. A system for training a watermark-aware draft machine learning model, comprising:

one or more processors; and a non-transitory computer readable medium storing instructions that, when executed by the one or more processors, cause the system to:

receive a training configuration comprising a watermarking key and a set of training prompts;

generate, by a target machine learning model configured to perform a generative watermarking process based on the watermarking key, a plurality of watermarked outputs for the set of training prompts;

assemble a training corpus comprising, for each training prompt of the set of training prompts, the training prompt, a corresponding watermarked output of the plurality of watermarked outputs, the watermarking key, and one or more target distribution signals derived from the target machine learning model under the generative watermarking process; and train, using the training corpus, a draft machine learning model to predict, for lookahead positions, candidate next tokens with respective draft probabilities aligned to the distribution signals from the target machine learning model, wherein:

the trained draft machine learning model is used to generate a lookahead comprising candidate next tokens with associated draft probabilities;

the target machine learning model evaluates, in a single inference pass, the candidate next tokens to generate respective target probabilities;

a first token subset of the candidate next tokens is accepted, wherein the accepted first token subset comprises each candidate next token of the candidate next tokens for which a respective target probability of the respective target probabilities is greater than or equal to an associated draft probability of the associated draft probabilities; and one or more replacement tokens are generated for a second token subset of the candidate next tokens, wherein the second token subset comprises each candidate next token of the candidate next tokens for which a respective target probability of the respective target probabilities is less than an associated draft probability of the associated draft probabilities.

13. The system of claim 12, wherein the instructions, when executed by the one or more processors, further cause the system to:

validate the draft machine learning model by computing, on a hold-out evaluation set, an acceptance metric that measures a proportion of candidate next tokens whose target probabilities from the target machine learning model according to the generative watermarking process are greater than or equal to corresponding draft probabilities from the draft machine learning model for a configured lookahead length;

store trained parameters of the draft machine learning model together with metadata comprising a key identifier for the watermarking key, and the acceptance metric; and deploy the draft machine learning model for use in watermark-preserving speculative text generation with the target machine learning model.

14. The system of claim 12, wherein the target distribution signals comprise one or more of logits, probabilities, acceptance masks for lookahead positions, or tournament-layer assignments produced by the target machine learning model according to the generative watermarking process.

15. The system of claim 12, wherein the training the draft machine learning model comprises optimizing a loss function that penalizes divergence from the target distribution signals for the lookahead positions.

16. The system of claim 12, wherein the generative watermarking process performed by the target machine learning model comprises tournament sampling across multiple layers using the watermarking key and repeated context masking.

17. The system of claim 12, wherein the draft machine learning model is configured with a same set of decoding settings as the target machine learning model.

18. The system of claim 12, wherein the draft machine learning model has fewer tunable parameters than the target machine learning model.

19. A method for watermark-preserving speculative text generation, comprising:

receiving a generation request comprising a prompt;

generating, by a draft machine learning model based on the prompt, a lookahead comprising a plurality of candidate next tokens with respective draft probabilities, wherein the draft machine learning model has been trained on watermarked outputs generated, based on a watermarking key, using a target machine learning model;

evaluating, in a single inference pass of the target machine learning model configured to perform a generative watermarking process, the plurality of candidate next tokens, based on the watermarking key, to generate respective target probabilities;

accepting a first token subset of the plurality of candidate next tokens based on comparing the respective target probabilities to the respective draft probabilities, wherein the accepted first token subset comprises each candidate next token of the plurality of candidate next tokens for which a respective target probability of the respective target probabilities is greater than or equal to a respective draft probability of the respective draft probabilities;

generating, by the target machine learning model, one or more replacement tokens for a second token subset comprising each candidate next token of the plurality of candidate next tokens not included in the first token subset, wherein the second token subset comprises each candidate next token of the plurality of candidate next tokens for which a respective target probability of the respective target probabilities is less than a respective draft probability of the respective draft probabilities; and outputting, in response to the generation request, text that includes the accepted first token subset and the one or more replacement tokens.

* * * * *